United States Patent
Crawford et al.

(10) Patent No.: US 6,278,931 B1
(45) Date of Patent: Aug. 21, 2001

(54) MOTOR VEHICLE CRUISE CONTROL WITH SELECTIVELY UPDATED INTEGRAL GAIN

(75) Inventors: Daniel Alexander Crawford, Burton; David Lynn Ehle, Lapeer; Joyce Dale Carsey, Swartz Creek; Diana K. Voges, Fenton; Michael G. Schuplin, Davison; Robert Harold Wind, Grand Blanc, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/542,375

(22) Filed: Apr. 4, 2000

(51) Int. Cl.$^7$ .................................................. B60K 31/04
(52) U.S. Cl. ........................... 701/93; 701/70; 701/110; 180/170
(58) Field of Search ............................. 701/93, 70, 110; 180/170, 179; 129/350

(56) References Cited

U.S. PATENT DOCUMENTS

| | | |
|---|---|---|
| 4,643,038 | 2/1987 | Byram ..................................... 74/397 |
| 4,684,866 | 8/1987 | Nehmer et al. ....................... 318/696 |
| 5,044,457 | 9/1991 | Aikam ................................... 180/178 |
| 5,420,793 * | 5/1995 | Oo et al. ................................. 701/93 |
| 5,495,251 * | 2/1996 | Gilling et al. .......................... 342/70 |
| 5,646,851 * | 7/1997 | O'Connell et al. ..................... 701/93 |
| 5,957,992 * | 9/1999 | Kiyono ................................... 701/93 |

* cited by examiner

Primary Examiner—William A. Cuchlinski, Jr.
Assistant Examiner—Marthe Marc-Coleman
(74) Attorney, Agent, or Firm—Vincent A. Cichosz

(57) ABSTRACT

An improved cruise control which produces a desired throttle position that is based in part on a selectively updated integral term. The integral term is only updated when the magnitude of the speed error exceeds a predefined value, thereby eliminating changes in the integral term when the speed error is smaller than the predefined threshold. In other words, the integral term is dynamic and responsive to a current error condition when the speed error magnitude exceeds the threshold, and static when the speed error is within the threshold. In this way, the operational advantages of the integral term are retained while avoiding its disadvantages, and the transition between the static and dynamic states of the integral term are smooth and seamless.

6 Claims, 2 Drawing Sheets

US 6,278,931 B1

MOTOR VEHICLE CRUISE CONTROL WITH SELECTIVELY UPDATED INTEGRAL GAIN

TECHNICAL FIELD

This invention relates to a method of operation for an automotive cruise control system, and more particularly to a control including integral gain.

BACKGROUND OF THE INVENTION

Vehicle speed or cruise control systems typically include an actuator for positioning the throttle of the vehicle engine in relation to the difference between a commanded vehicle speed and a measure of the actual vehicle speed. Such difference, commonly referred to as the speed error, is periodically computed and used to develop a desired throttle position, and a feedback control system brings the actual throttle position into correspondence with the desired position.

The development of the desired throttle position generally involves some mathematical processing of the speed error and other related signals, and a calculation or table-look up that takes vehicle-specific characteristics and time constants into account. In general, the mathematical processing can be characterized as comprising various combinations of proportional, integral and derivative terms. For example, a PI or proportional-plus-integral control entails the summation of a first term proportional to the speed error itself, and a second term proportional to the integral of the speed error. The proportional term alone may be adequate under most conditions, but its gain is usually limited to ensure control system stability. In a cruise control systems, this means that small speed errors due to road grade, for example, may remain uncorrected. The integral term is used to correct such errors and thereby improve the control response to non-zero road grades because the value of the integral term increases with cumulative speed error. However, if the integral gain is set high enough to provide quick response to changing road grade, it tends to produce undulations in the commanded throttle position when the road grade is essentially constant. Such undulations are not only unnecessary, but also undesired, as they may be noticeable to the vehicle passengers and accelerate wear of the throttle actuator. Accordingly, what is needed is a vehicle cruise control that has the advantages of integral gain without the above-described disadvantages.

SUMMARY OF THE INVENTION

The present invention is directed to an improved cruise control that produces a desired throttle position (or more generally, a desired setting of the vehicle power plant) that is based in part on a selectively updated integral term. According to the invention the integral term is only updated when the magnitude of the speed error exceeds a predefined value, thereby eliminating changes in the integral term when the speed error is smaller than the predefined threshold. In other words, the integral term is dynamic and responsive to a current error condition when the speed error magnitude exceeds the threshold, and static when the speed error is within the threshold. In this way, the operational advantages of the integral term are retained while avoiding its disadvantages, and the transition between the static and dynamic states of the integral term are smooth and seamless.

DESCRIPTION OF THE PREFERRED EMBODIMENT

Figure 1:
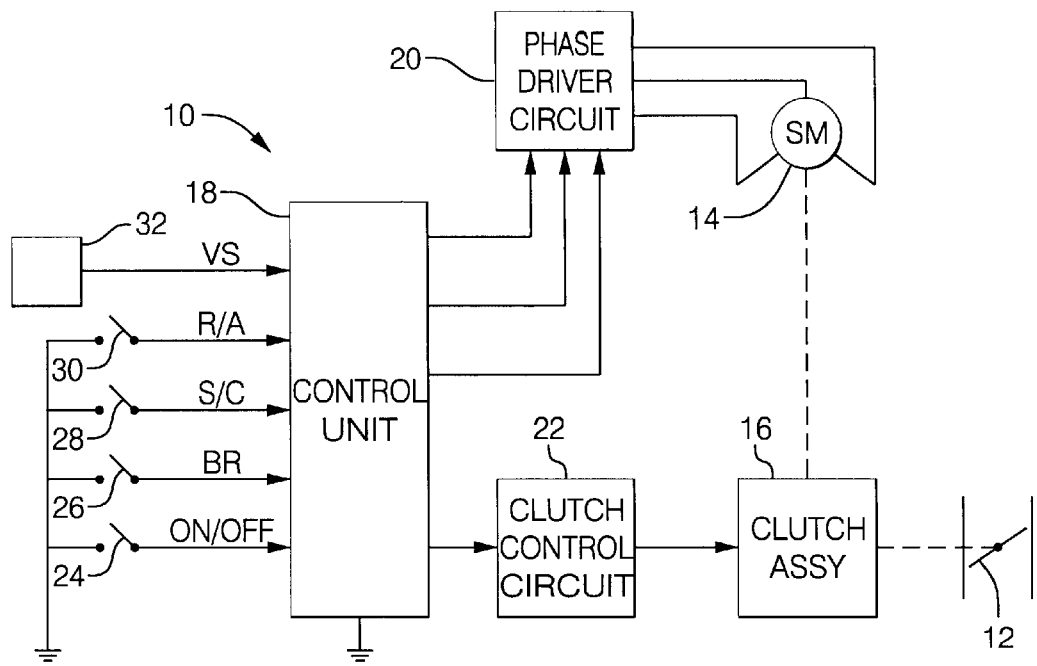
FIG. 1 is a diagram of a motor vehicle cruise control system, including a microprocessor-based control unit.

Referring to FIG. 1, the present invention is disclosed in the context of a cruise control system 10 in which an engine throttle 12 is coupled to an electric stepper motor 14 through a clutch assembly 16 for purposes of positioning the throttle 12 to achieve and maintain a desired vehicle speed. A microprocessor-based control unit 18 develops a desired motor position (M_POS_DES) based on various inputs as described below, and energizes the motor 14 via phase driver circuit 20 to bring the actual motor position (M_POS_ACT) into correspondence with M_POS_DES. The control unit 18 regulates the operation of clutch assembly 16 via the clutch control circuit 22. The system 10 also includes a number of driver-operated switches: ON/OFF switch 24, brake (BR) switch 26, Set/Coast (S/C) switch 28, and Resume/Accel (R/A) switch 30. The control unit 18 receives an input from each of the switches 24, 26, 28, 30 and additionally receives a vehicle speed input VS from the speed sensor 32.

Further detail regarding the above-described elements is set forth in the following U.S. Patents, each of which is assigned to the assignee of the present invention and incorporated herein by reference: Byram U.S. Pat. No. 4,643,038, issued on Feb. 17, 1987; Nehmer et al. U.S. Pat. No. 4,684,866, issued Aug. 4, 1987; and Aikman U.S. Pat. No. 5,044,457, issued Sep. 3, 1991.

In general, the control unit 18 develops a desired motor position (MOT_POS_DES), and then determines suitable motor control signals for eliminating discrepancies between the actual and desired motor positions. The desired motor position is typically retrieved from a two-dimensional look-up table as a function of a proportional speed error term, which may be mathematically represented as (Gp * SPD_ERR), where Gp is a proportional gain term, and SPD_ERR is the vehicle speed error. The look-up table values are calibrated to achieve a desired vehicle response when the vehicle is being operated on a straight road with little or no grade. An integral term (INT) is added to the proportional speed error term for purposes of addressing the look-up table in order to achieve acceptable response when the road grade is non-zero or changing. That is, the table is addressed by a value which can be expressed as (Gp * SPD_ERR)+INT.

The integral term is ordinarily free to react to a current error condition when the magnitude of the speed error (i.e., |SPD_ERR|) is at least as great as a predefined integral threshold (THR_INT), but is maintained at its current value when |SPD_ERR| falls below the integral threshold. In other words, the integral term INT is dynamic when |SPD_ERR|≧THR_INT, and static when |SPD_ERR|<THR_INT. In terms of digital processing, the integral term INT is updated at a periodic rate when |SPD_ERR|≧THR_INT, but is not updated when |SPD_ERR|<THR_INT. In this way, the system 10 responds acceptably to road grade variations, while vehicle speed undulations at or near zero road grade are significantly reduced. There are no abrupt changes in the desired motor position as the speed error crosses the integral threshold, and any error introduced by the residual integral term INT when |SPD_ERR|<THR_INT is either insignificant or corrected by changes in the proportional term (Gp * SPD_ERR).

Figure 2:
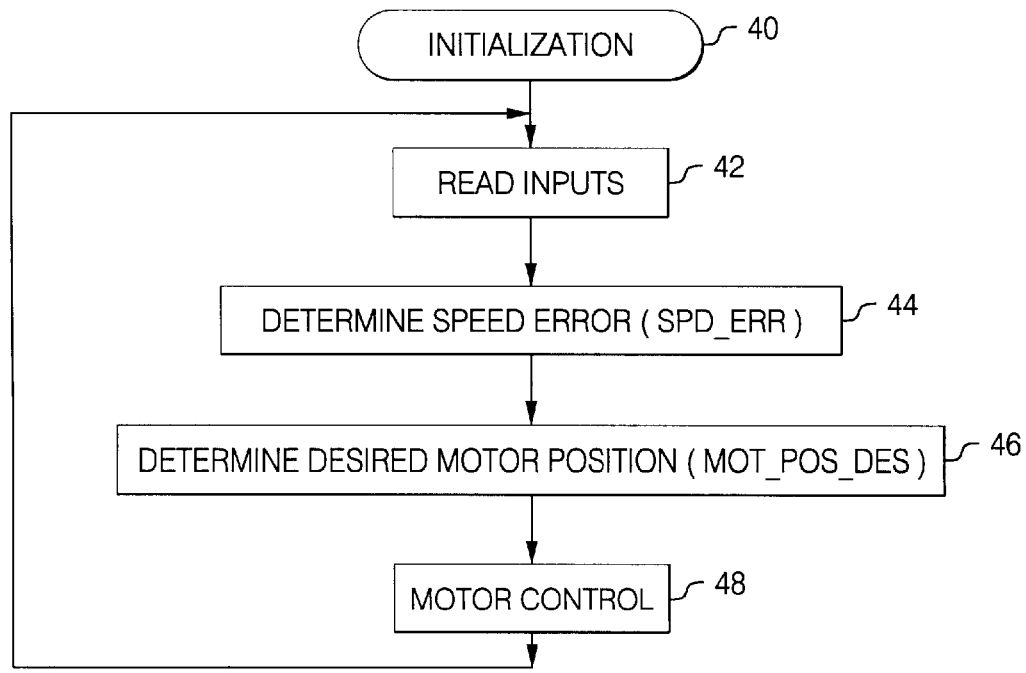
FIGS. 2–3 are flow diagrams representative of computer program instructions executed by the control unit of FIG. 1 in carrying out the control of this invention.
Figure 3:
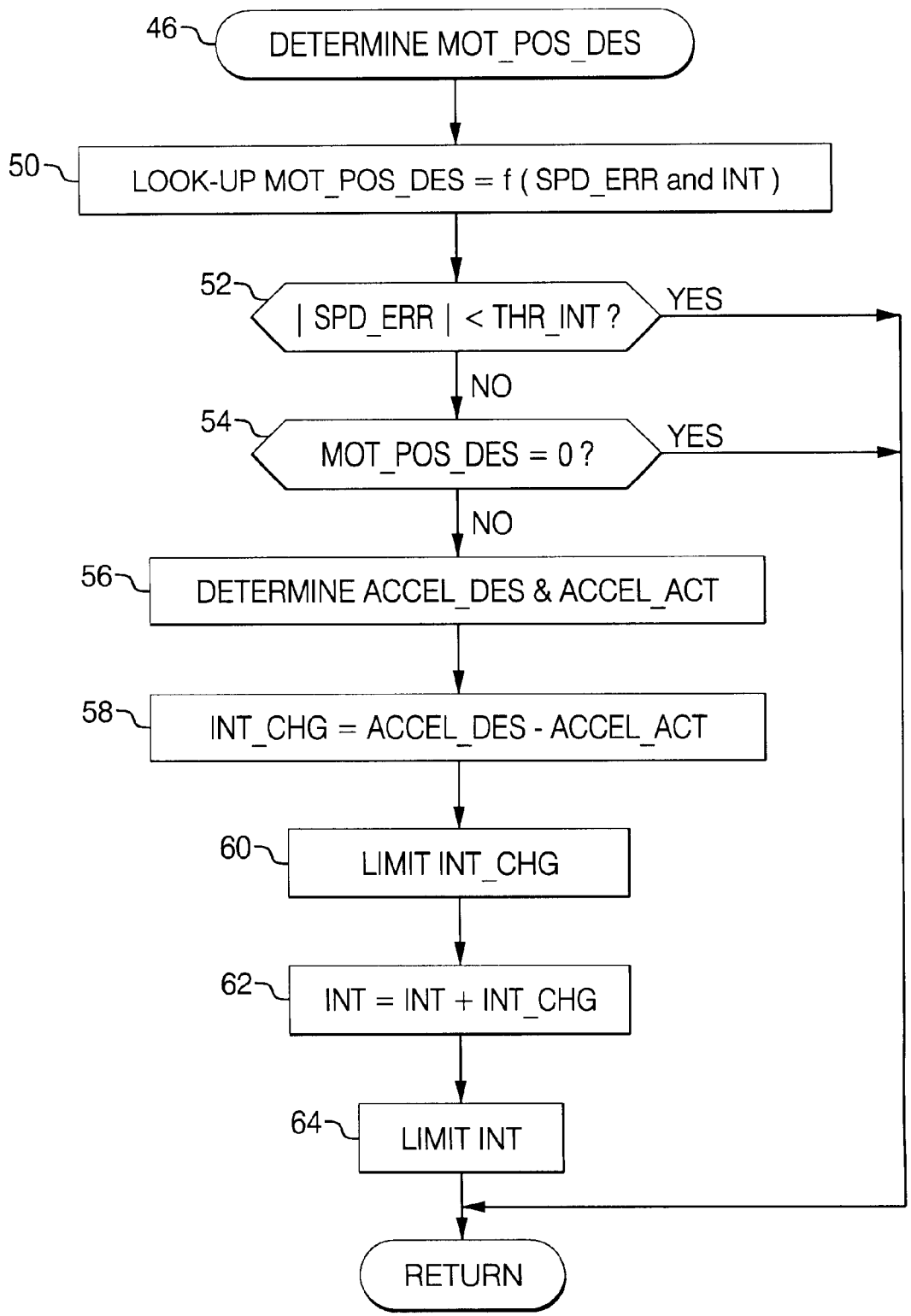

FIGS. 2 and 3 are flow diagrams representative of computer program instructions executed by the control unit 18 of FIG. 1 in carrying out the above-described control. FIG. 2 is a main or executive flow diagram, while FIG. 3 details a portion of the main flow diagram relating to determination of the desired motor position (MOT_POS_DES).

Referring to FIG. 2, the main flow diagram comprises a series of initialization instructions (block 40) executed at the initiation of cruise control operation, and a series of operating instructions (blocks 42–48) that are repeatedly executed during cruise control operation. The initialization block 40 initializes or resets various system flags and variables, such as the speed error SPD_ERR and integral term INT. The blocks 42–48 successively read the various inputs described above in reference to FIG. 1, determine the vehicle speed error SPD_ERR and the desired motor position MOT_POS_DES, and control motor 14 so as to bring its actual position (MOT_POS_ACT) in to correspondence with MOT_POS_DES. The speed error SPD_ERR is simply the difference between the measured vehicle speed VS and a vehicle speed selected by the driver through actuation of the switches 28 and/or 30. The determination of MOT_POS_DES is described below in reference to the flow diagram of FIG. 3, and a representative motor control corresponding to block 48 is described in the aforementioned U.S. Pat. No. 4,684,866 to Nehmer et al.

Referring to FIG. 3, it is seen in block 50 that the desired motor position MOT_POS_DES is determined by table look-up as a function of both SPD_ERR and INT. More specifically, the MOT_POS_DES is determined as a function of (Gp * SPD_ERR)+INT, where Gp is a proportional gain term. The integral term INT is initially zero, as mentioned above in respect to the initialization block 40. If the magnitude, or absolute value, of the speed error (|SPD_ERR|) is less than the integral threshold THR_INT, as determined at block 52, the remainder of the routine is skipped, and the integral term INT is not updated. Similarly, the integral term INT is not updated if the desired motor position is zero, as determined at block 54. However, if |SPD_ERR|≧THR_INT, and MOT_POS_DES is non-zero, the blocks 56–64 are executed to update the integral term INT.

In the illustrated embodiment, the integral term INT is updated based on an error between the actual acceleration of the vehicle ACCEL_ACT and the desired acceleration of the vehicle ACCEL_DES. The term ACCEL_ACT may be determined based on the detected change in vehicle speed VS over a given time interval, while the term ACCEL_DES may be determined either mathematically or by table look-up based on the speed error SPD_ERR. Thus, block 56 determines ACCEL_DES and ACCEL_ACT, and block 58 computes the integral change term INT_CHG according to the difference (ACCEL_DES_ACCEL_ACT). Block 60 limits INT_CHG based on predefined positive and negative maximum values, block 62 updates the integral term INT as the sum (INT+INT_CHG), and block 64 limits the updated integral term INT based on predefined positive and negative maximum values, completing the routine. It will be recognized that various other methods of computing the integral change term INT_CHG will be known to those skilled in art; by way of example, and without limitation, INT_CHG may be simply computed according to the product (Gi * SPD_ERR), where Gi is an integral gain term.

In summary, the present invention provides an improved cruise control that retains the advantages of an integral term but avoids its disadvantages, while providing a seamless transition between the static and dynamic states of the integral term. While the present invention has been described in reference to the illustrated embodiment, it will be understood that various modifications in addition to those mentioned above will occur to those skilled in the art. For example, the invention may be carried out with discrete or analog circuitry, or in connection with a cruise control system utilizing a pneumatic or other type of throttle actuator, or in connection with an electric vehicle (in which case, MOT_POS_DES could be characterized as a desired motor torque), and so on. Accordingly, it will be understood that systems and controls incorporating such modifications and variations may fall within the scope of this invention, which is defined by the appended claims.

What is claimed is:

1. A motor vehicle cruise control that determines a speed error according to a difference between desired and measured vehicle speeds, computes a control variable according to a sum of a first term proportional to the determined speed error and a second term proportional to an integral of the determined speed error, determines a power plant command based on the control variable for bringing the measured vehicle speed into correspondence with the desired vehicle speed, and adjusts a vehicle power plant setting in accordance with the power plant command, the improvement wherein:

the second term is selectively updated to reflect changes in the speed error, based upon a comparison of a magnitude of the speed error relative to a predefined threshold error that is greater than zero, such that:
when the speed error magnitude falls below the threshold error, updating of the second term is discontinued and a then-current value of the second term is maintained; and
when the speed error magnitude subsequently rises above the threshold error, updating of the second term is resumed.

2. The cruise control of claim 1, wherein the second term is initialized to a predefined value when cruise control operation is initiated.

3. The cruise control of claim 1, wherein the second term is periodically updated according to a sum of an integral change term and the then-current value of the second term when the speed error magnitude is above the predefined threshold.

4. A motor vehicle cruise control method comprising the steps of:

determining a speed error according to a difference between desired and measured vehicle speeds;
updating a proportional control term based on the determined speed error;
comparing a magnitude of the determined speed error to a predefined threshold error that is greater than zero;
updating an integral control term based on the determined speed error only if the speed error magnitude is at least as great as the threshold error, and otherwise maintaining the integral control term at its then-current value;
computing a control variable according to a sum of the proportional and integral control terms;

determining a power plant command based on the control variable for bringing the measured vehicle speed into correspondence with the desired vehicle speed; and adjusting a vehicle power plant setting in accordance with the power plant command.

5. The cruise control method of claim 4, including the step of:

initializing the integral control term to a predefined value when cruise control operation is initiated.

6. The cruise control method of claim 4, wherein the speed error is periodically determined, and the step of updating the integral term includes the steps of:

determining an integral change amount based on the determined speed error; and adding the integral change amount to a current value of the integral term.

\* \* \* \* \*